United States Patent
Sun et al.

(10) Patent No.: US 7,983,159 B2
(45) Date of Patent: Jul. 19, 2011

(54) QUEUE-BASED ACTIVE QUEUE MANAGEMENT PROCESS

(75) Inventors: Jinshen Sun, Nanjing (CN); King-Tim Ko, Hong Kong SAR (CN); Guanrong Chen, Hong Kong (CN); Sammy Chan, Hong Kong (CN); Moshe Zukerman, Hong Kong (CN)

(73) Assignee: Intellectual Ventures Holding 57 LLC, Las Vegas, NV (US)

( * ) Notice: Subject to any disclaimer, the term of this patent is extended or adjusted under 35 U.S.C. 154(b) by 0 days.

(21) Appl. No.: 12/758,502

(22) Filed: Apr. 12, 2010

(65) Prior Publication Data
US 2010/0195494 A1    Aug. 5, 2010

Related U.S. Application Data

(63) Continuation of application No. 10/928,765, filed on Aug. 27, 2004, now Pat. No. 7,706,261.

(51) Int. Cl.
*H04L 12/26* (2006.01)
*H04L 12/56* (2006.01)

(52) U.S. Cl. ............ 370/230; 370/252; 370/412

(58) Field of Classification Search ......... 370/229–236, 370/252–253, 412–419; 709/231
See application file for complete search history.

(56) References Cited

U.S. PATENT DOCUMENTS

| | | | |
|---|---|---|---|
| 6,259,698 B1 | 7/2001 | Shin et al. | |
| 6,405,256 B1 | 6/2002 | Lin et al. | |
| 6,721,273 B1 | 4/2004 | Lyon | |
| 6,724,776 B1 * | 4/2004 | Jeffries | 370/468 |
| 6,788,697 B1 | 9/2004 | Aweya et al. | |
| 6,850,764 B1 | 2/2005 | Patel | |
| 6,865,185 B1 | 3/2005 | Patel et al. | |
| 6,961,307 B1 | 11/2005 | Aweya et al. | |
| 6,996,062 B1 | 2/2006 | Freed et al. | |
| 7,047,312 B1 | 5/2006 | Aweya et al. | |
| 7,272,111 B2 | 9/2007 | Zukerman et al. | |

OTHER PUBLICATIONS

Office Action, mailed Oct. 16, 2007 for U.S. Appl. No. 10/928,765.
Office Action, mailed Mar. 11, 2008 for U.S. Appl. No. 10/928,765.
Office Action, mailed Jul. 11, 2008 for U.S. Appl. No. 10/928,765.

(Continued)

*Primary Examiner* — Kerri M Rose
(74) *Attorney, Agent, or Firm* — Schwabe, Williamson & Wyatt, P.C.

(57) ABSTRACT

An active queue management (AQM) process for network communications equipment. The AQM process is queue based and involves applying at a queue size threshold congestion notification to communications packets in a queue of a link via packet dropping; and adjusting said queue size threshold on the basis of the congestion level. The AQM process releases more buffer capacity to accommodate more incoming packets by increasing said queue size threshold when congestion increases; and decreases buffer capacity by reducing said queue size threshold when congestion decreases. Network communications equipment includes a switch component for switching communications packets between input ports and output ports, packet queues for at least the output ports, and an active queue manager for applying congestion notification to communications packets in the queues for the output ports via packet dropping. The congestion notification is applied at respective queue size thresholds for the queues, and the thresholds adjusted on the basis of the respective congestion levels of the queues of the output ports.

14 Claims, 6 Drawing Sheets

OTHER PUBLICATIONS

Office Action, mailed Dec. 23, 2008 for U.S. Appl. No. 10/928,765.
Office Action, mailed Aug. 4, 2009 for U.S. Appl. No. 10/928,765.
Notice of Allowability, mailed Dec. 11, 2009 for U.S. Appl. No. 10/928,765.
J. Sun, et al., "Adaptive Drop-Tail: A Simple and Effective Queue Management Algorithm for Internet Flow Control," Proceedings of the 18th International Teletraffic Congress, Berlin, Germany, Aug. 31-Sep. 2003.
Sally Floyd and Devin Fall, "Router Mechanisms to Support End-to-End Congestion Control," Network Research Group, Lawrence Berkeley National Laboratory, Berkeley, CA, Feb. 15, 1997, pp. 1-19.
Sally Floyd and Van Jacobson, "Random Early Detection Gateways for Congestion Avoidance," IEEE/ACM Transactions on Networking, vol. 1, No. 4, Aug. 1993, pp. 397-413.

* cited by examiner

QUEUE-BASED ACTIVE QUEUE MANAGEMENT PROCESS

RELATED APPLICATION

This application is a continuation application of U.S. application Ser. No. 10/928,765, entitled "Queue-based Active Queue Management Process," filed on Aug. 27, 2004, and claims priority to the Ser. No. 10/928,765 application, which is now U.S. Pat. No. 7,706,261.

FIELD OF THE INVENTION

The present invention relates to a queue-based active queue management process, and network equipment for executing the process.

BACKGROUND OF THE INVENTION

The congestion control and avoidance mechanisms of the Internet, implemented through its end-to-end Transmission Control Protocol (TCP), significantly affects its throughput and stability. TCP uses a window-based flow control mechanism. The sender maintains a congestion window cwnd whose value limits the number of outstanding packets the sender can send. The destination sends acknowledgements for packets that are received. When the window size is exhausted, the sender must wait for an acknowledgement before sending a new packet based on a sliding window principle. This is known as the 'self-clocking' feature of TCP.

According to the congestion control algorithm of TCP, if packet loss occurs within the window, it is assumed that the losses are caused by congestion and hence the congestion window is halved; otherwise, the congestion window is increased by one. The Internet is essentially a network of interconnected queues. The queues are maintained at the ports of the various routers, switches and servers that form the links of the communications network that is the Internet. Traditionally, the network equipment, or nodes, manage their queues by accepting packets until the maximum queue length is reached and then dropping subsequent incoming packets until buffers become available. This method is known as Droptail. Droptail has served the Internet for years. However, study has shown that Droptail has some major drawbacks. Since Droptail only notifies the sender (by means of dropping a packet) when the buffer overflows, and due to latency and delayed reaction by the sender, Droptail allows the queue to maintain a full (or almost full) status for a long period of time. This has two adverse effects: (1) long queuing delay in the routers, which in turn increases packet latency, and (2) a long period of packet loss which, when combined with long latency, means that senders react too aggressively to congestion—reducing their rate drastically, often unnecessarily—thus causing wastage of capacity and low utilization.

For Droptail when queue overflow occurs, arriving packets are simply dropped. Droptail is effectively 'no management'. The major problem of Droptail queue management is that the sources reduce their transmission rates only after detecting packet losses. Since considerable amount of time may have elapsed between the packet dropped at the router and its detection at the source, a large number of packets are continually sent at a rate that the network cannot support. This leads to high queue sizes and high loss rates at congested links.

Active queue management (AQM) processes have been introduced to alleviate the problems of network congestion. In general, AQM processes control congestion by controlling flow. Congestion is measured and a control action is taken to, ultimately, reduce the packet loss rates and queuing delays. AQM sends congestion notification to traffic sources, using packet marking or dropping, before a queue has reached its maximum size, so that the traffic sources can respond to the congestion before the actual buffers overflow.

There have been two approaches for measuring congestion: (1) queue based, and (2) flow based. In queue based AQMs congestion is determined by simply observing the queue size. The advantage of this is that it does not require any computations in comparison with flow based AQMs which determines congestion based on the real-time estimation of the packet arrival rates.

One technique for congestion control is Random Early Drop (RED). The key idea of RED is to keep the average buffer occupancy low. RED manages the queue in an active manner by randomly dropping packets with increasing probability as the average queue size increases. The packet drop rate increases linearly from zero, when the average queue size is at the RED parameter $min_{th}$, to a drop rate of $max_p$ when the average queue size reaches $max_{th}$. One of the RED's main goals is to use the combination of queue length averaging (which accommodates bursty traffic) and early congestion notification (which reduces the average queue length) to simultaneously achieve a low average queuing delay and a high throughput. So far, RED is the most prominent and widely studied AQM mechanism.

The total network delay is essentially the sum of queuing delay, in routers and switches and other equipment of the network, and propagation delay in the physical transport medium, such as the optical fiber or copper wire that support the links. Currently queuing delay dominates most round trip times (RTT), being the time a packet takes to travel from a source to a destination and return. An ideal is to reduce the network delay to just the propagation delay.

Industry is designing routers with increasing buffer size and the industry rule is that routers should be able to store data equal to RTT×transmission rate. For example, if the transmission rate is 10 Gb/s, and assuming RTT=200 ms, then the buffer capacity must be of the order of 2 GB. Given this industry trend it is important to have an effective queue-based AQM that will maintain high throughput as well as low latency under various traffic conditions, and which at the same time will be simple to implement.

It is desired to provide an AQM process that maintains high link utilization whilst achieving the QoS (Quality of Service) requirements of limited packet loss and delay, or at least provide a useful alternative.

SUMMARY OF THE INVENTION

In accordance with the present invention there is provided a queue-based active queue management process, including: applying, at a queue size threshold, congestion notification to communications packets in a queue of a link via packet dropping; and adjusting the queue size threshold on the basis of the congestion level. When congestion increases, more buffer capacity is released to accommodate more incoming packets by increasing the queue size threshold. Buffer capacity is decreased by reducing the queue size threshold when congestion decreases.

In another aspect, the present invention also provides network communications equipment, including: a switch component for switching communications packets between input ports and output ports; packet queues for the output ports; and an active queue manager for applying congestion notification to communications packets in the queues for the output ports via packet dropping. Congestion notification is applied at respective queue size thresholds for the packet queues, and the queue size thresholds are adjusted on the basis of the respective congestion levels for the queues of the output ports.

BRIEF DESCRIPTION OF THE DRAWINGS

Some embodiments of the present invention will be described by way of example and with reference to the accompanying drawings, in which.

DETAILED DESCRIPTION OF PREFERRED EMBODIMENTS OF THE INVENTION

Active Queue Management processes are executed by network equipment that is capable of transmitting and receiving packets of a packet communications network, such as the Internet. The equipment includes routers, switches and servers that have input/output ports coupled to a physical transmission medium, such as optical fiber, cable or copper wire. Queues are established at the ports to control the transmission and reception of packets on the links established between the ports. This is required to ensure that link congestion does not occur, as each link only has a predetermined capacity.

Figure 1:
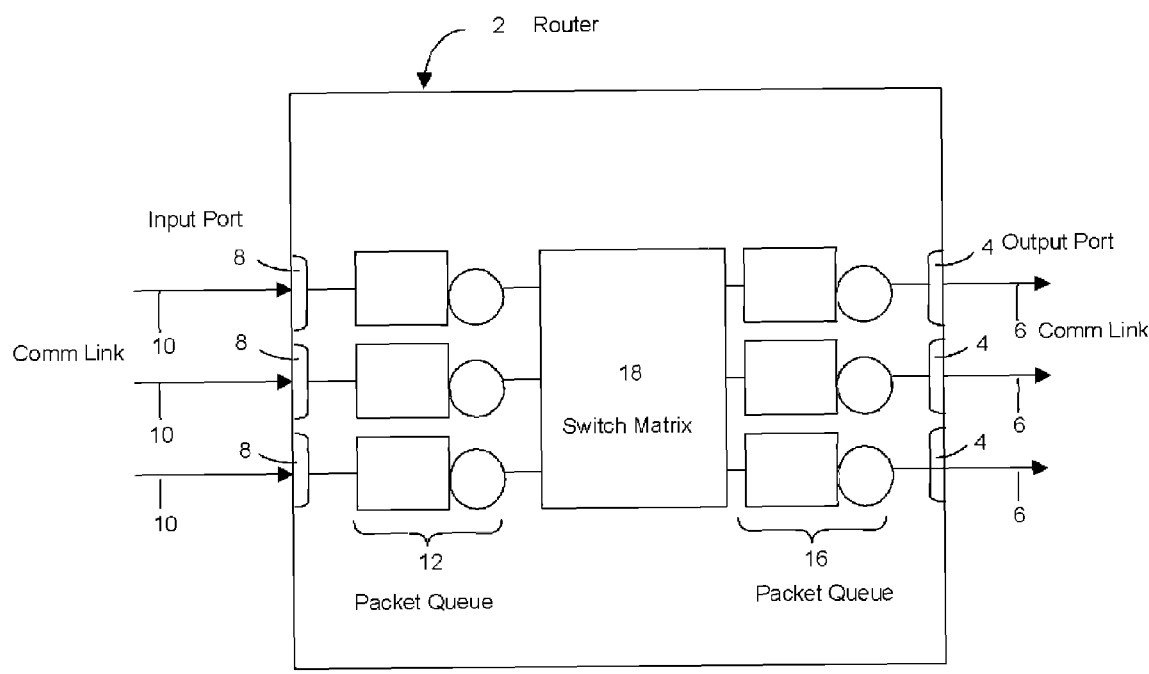
FIG. 1 is a block diagram of a router of a communications network in which an AQM process according to an embodiment of the invention may be implemented.

For example, a router 2, as shown in FIG. 1, has a plurality of output communication ports 4 connected to physical media that are used to establish output communication links 6 to input ports of other devices. The router also has input ports 8 for input communication links 10. The links 6, 10 may be logical or physical links. The router may be specifically configured to handle IP (Internet Protocol) packets, and each port 4, 8 has a packet queue 16, 12 allocated to each link 6, 10 of the port. For the input links 10, the packet queues 12 buffer the received packets and serve them to a switch matrix 18 of the router 2. The packets output by the switch matrix 18 are passed to the queues 16 and served to the respective output links 6. The queues 16 and 12 normally have a predetermined buffer size. The queues 16,12 may be maintained by dedicated hardware components, but normally the AQM processes of an active queue manager and the queues are implemented in software executed by the router 2.

Typically the active queue management process is implemented on the output queues 16. It is also possible, however, to include packets in the input queues as part of the active queue management process.

A preferred embodiment of the present invention is an AQM process that is hereinafter referred to as Adaptive Drop-Tail. Adaptive Drop-Tail is an AQM process based on the idea that once some packets are lost and congestion notifications are sent to senders, buffer capacity should momentarily increase to be able to absorb packets innocently sent due to delay in congestion notification. Existing proposals do the opposite: they increase the drop rate as congestion increases. An advantage of Adaptive Drop-Tail is that it reduces the number of packets unnecessarily dropped and therefore also avoids the drastic and unnecessary reduction in transmission rate.

Adaptive Drop-Tail AQM is based on a queue of total capacity Q with variable threshold values adapting to the traffic load. In preferred embodiments the method is based on three parameters, denoted $Q_{min}$, $\Delta Q$ and $\Delta T$. The algorithm works as follows. At the beginning, the virtual queue capacity (or queue size threshold) denoted $Q_v$ is set at $Q_{min}$ (note that $Q_{min}$ is set to be significantly lower than Q) and packets are dropped as if the real queue capacity is equal to $Q_v$. If there have been packets dropped within a sampling time interval $\Delta T$, then the virtual queue capacity $Q_v$ is increased by an amount $\Delta Q$, provided that the new $Q_v$ does not exceed the total queue capacity of Q. If packets have not been dropped in the sampling time interval, then if the current queue length (at the end of the last time interval $\Delta T$) is smaller than that of the virtual queue capacity minus $\Delta Q$, the virtual queue capacity $Q_v$ is decreased by $\Delta Q$, provided that the new virtual queue capacity $Q_v$ is not smaller than $Q_{min}$. In this way, after some packets are dropped and thus congestion notification is sent to senders, buffer capacity is momentarily increased to absorb packets innocently sent due to delay in congestion notification. In doing so, the number of packets dropped is reduced and a drastic reduction in transmission rate is avoided. This process is then repeated over a new sampling time $\Delta T$.

Figure 2:
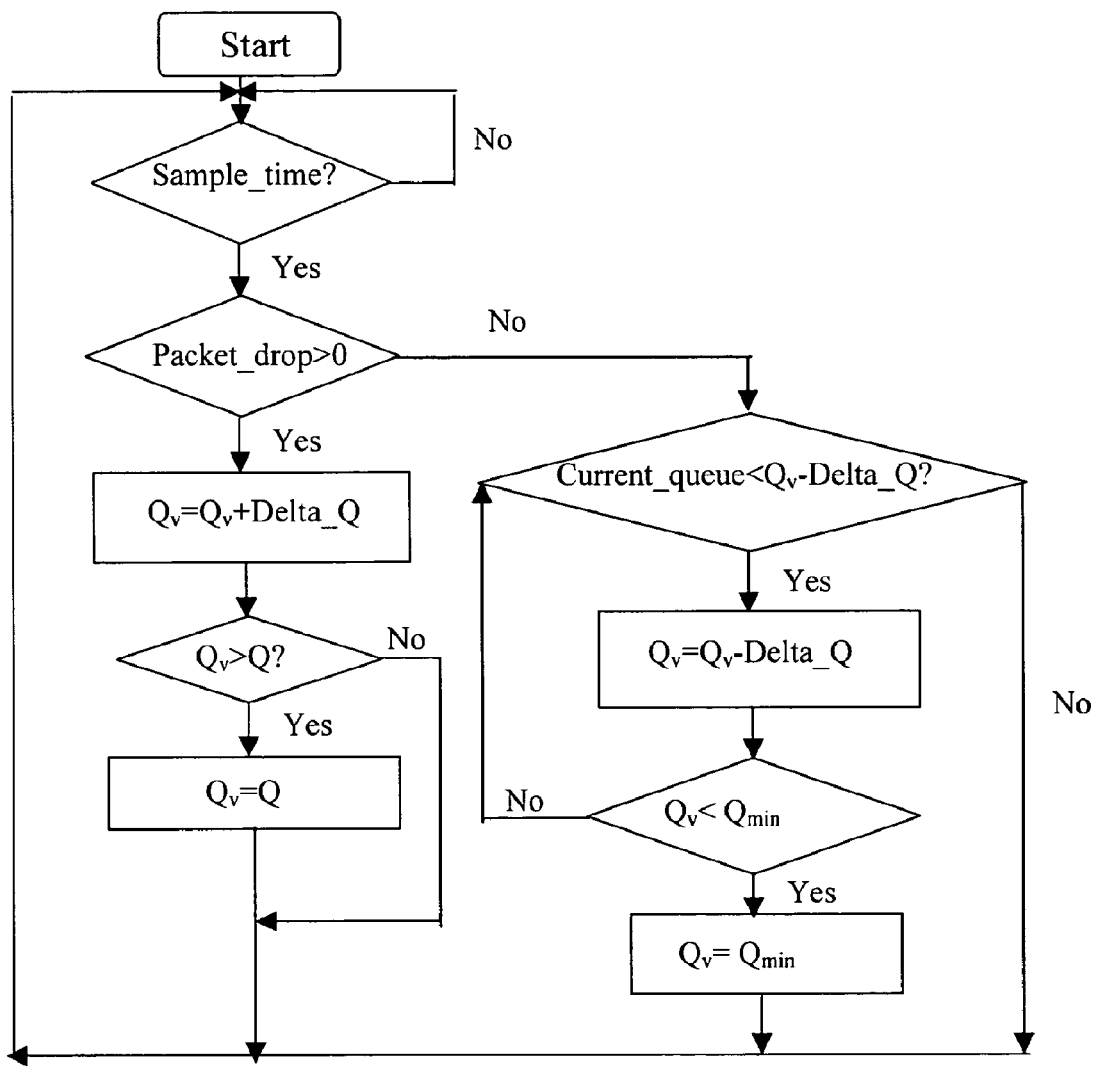
FIG. 2 is a flowchart of an AQM process according to an embodiment of the present invention.

The flow chart of Adaptive Drop-Tail is illustrated in FIG. 2, where Sample_time represents the end of a sampling interval, Current_queue is the current queue size, and Packet_drop is the number of packets dropped in the last sampling interval.

Figure 3:
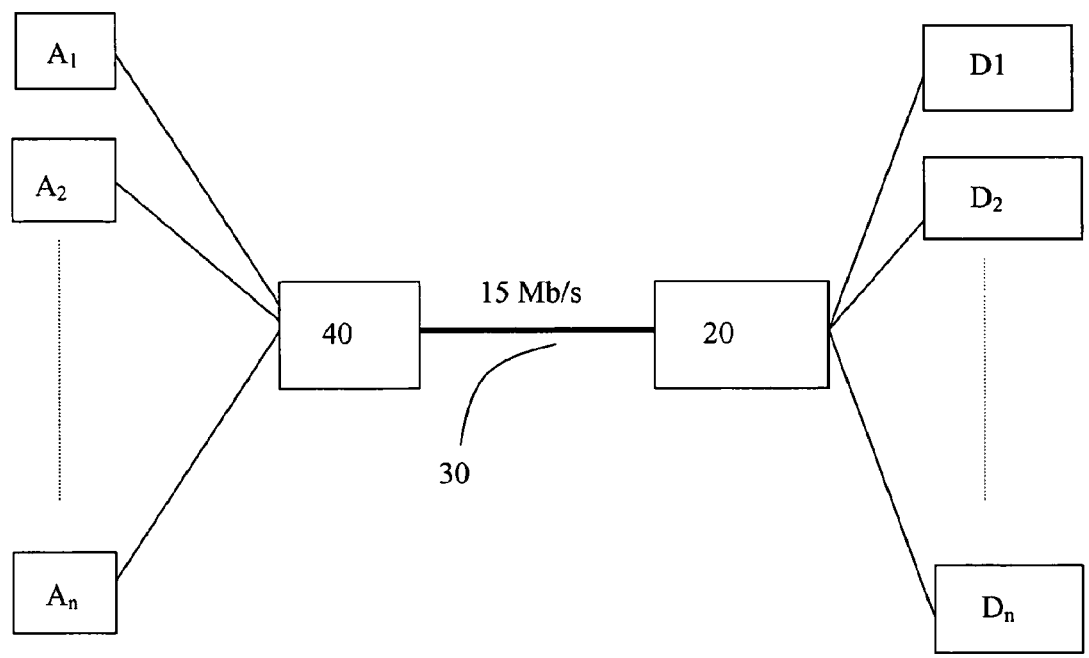
FIG. 3 is a diagram of nodes of a communications network in which an AQM process is executed in an example of the invention.

A trial was performed to compare the performance of Droptail, RED, Adaptive RED and Adaptive Drop-Tail using the ns-2 network simulator available at http://www.isi.edu/nsnam/ns/. The network topology for the trial, as shown in FIG. 3, includes a number of nodes $A_1$-$A_n$ that act as TCP packet sources and a number of nodes $D_1$-$D_n$ as the sink destination nodes. Each TCP connection is a long-lived and saturated TCP Reno flow. In other words, the TCP connections are modeled as greedy FTP connections, which always have data to send as long as their congestion windows permit. The receiver's advertised window size is set sufficiently large so that TCP connections are not constrained at the destination. The ack-every-packet strategy is used at the TCP receivers. The AQM process is placed in and executed by a node 40, which acts as an edge router connected to each of the TCP/IP sources $A_1$-$A_n$ and a link 30 between the node 40 and the node 20. The link 30 has a 40 ms propagation delay and has capacity of 15 Mb/s. For the links from the sources $A_1$-$A_n$ to the node 40, the propagation delays are assumed to be negligible and the capacities are 15 Mb/s. The packet size is 500 bytes. The physical buffer size is 600 packets, and the number of TCP connections ranges from 4 to 320. The total simulation time is 20 seconds.

The parameters of RED (see notation in Sally Floyd, Van Jacobson, "Random Early Detection Gateways for Congestion Avoidance" IEEE/ACM Transactions on Networking, V.1 N.4, August 1993, p. 397-413) are set at $min_{th}$=60, $max_{th}$=480, $max_p$=0.1 and $w_q$=0.002. For Adaptive RED, the parameters $min_{th}$, $max_{th}$, and $w_q$ are set the same as for RED, and other parameters are the same as in S. Floyd, R. Gummadi and S. Shenker, "Adaptive RED: an algorithm for increasing the robustness of RED's active queue management," available at http://www.icir.org/floyd/red.html: $\alpha$=0.01, $\beta$=0.9, intervaltime=0.5 s and target=$(\max_{th}+\min_{th})/2$. For the Adaptive Drop-Tail AQM algorithm, we set $\Delta T$=0.05 s, $Q_{min}$=60 and $\Delta Q$=30.

The following criteria are used to compare the performances of the different AQM processes:
  TCP goodput of the common link: this gives the best possible use of the available common link resources.
  TCP drop Rate.
  Queue Size.

Figure 4:
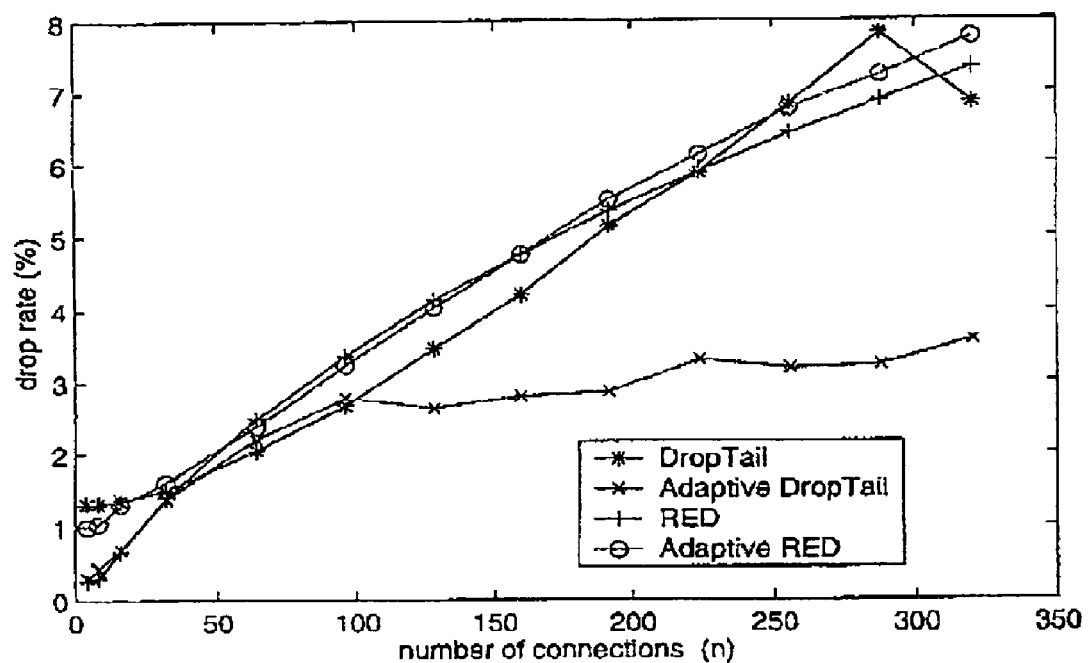
FIG. 4 is a graph of packet loss probability against the number of TCP sessions for a number of AQM processes.
Figure 5:
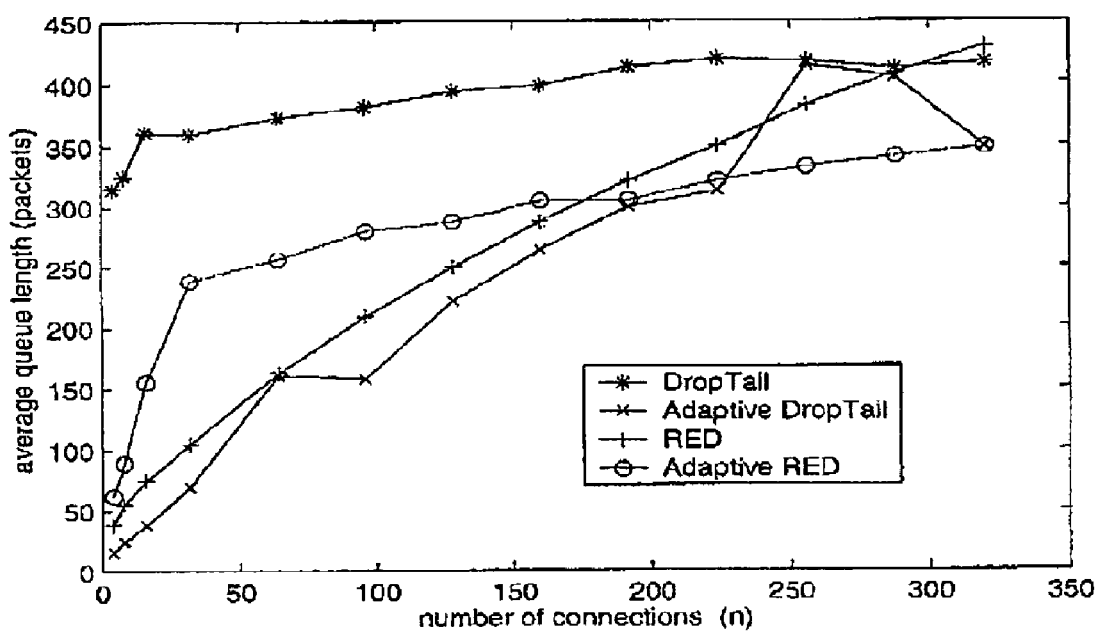
FIG. 5 is a graph of average queue length against the number of TCP sessions for a number of AQM processes.
Figure 6:
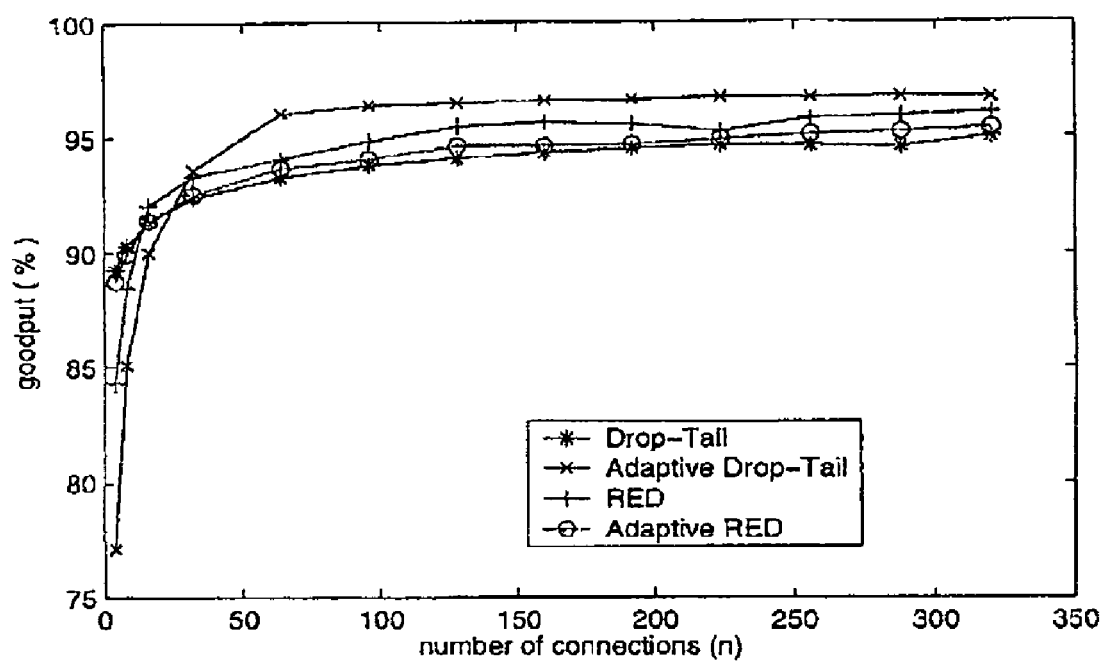
FIG. 6 is a graph of goodput against the number of TCP sessions for a number of AQM processes.

FIGS. 4-6 present simulation results of drop rate, average queue length, and goodput, versus connection number, averaged over the 20 second simulation period. It can be seen that the packet drop rate of Adaptive Drop-Tail is significantly lower than that of Droptail, RED, and Adaptive RED, when the number of connections n is larger than 100. The average queue length of Adaptive Drop-Tail is lower than that of Droptail for all n values tested, and is lower than that of RED and Adaptive RED for n<230. The goodput of Adaptive Drop-Tail is larger than that of Droptail, RED, and Adaptive RED, for n>32.

Further details and information of preferred embodiments of the invention are found in J. Sun, et al., "Adaptive Drop-Tail: A Simple and Effective Queue Management Algorithm for Internet Flow Control," Proceedings of the 18th International Teletraffic Congress, Berlin, Germany, 31 August-September 2003 (10 pages), which is hereby incorporated by reference.

Many modifications will be apparent to those skilled in the art without departing from the scope of the present invention as herein described with reference to the accompanying drawings.

The invention claimed is:

1. A method comprising:
  setting a virtual queue capacity $Q_v$ of a queue associated with a port of a networking apparatus, by a queue manager of the networking apparatus, to a capacity value $Q_{min}$, wherein the queue has a real capacity of Q, where $Q_{min}$ is smaller than Q;
  determining an amount of packet dropped within a sampling time interval $\Delta T$ by the queue manager; and
  adaptively managing the queue by the queue manager by adjusting $Q_v$ based at least in part on the result of said determining;
  wherein adaptively managing comprises
    incrementing $Q_v$ by an increment, in response to a result of the determining indicating there have been packets dropped during the sampling time interval $\Delta T$, and
    decrementing $Q_v$ by a decrement, in response to a result of the determining indicating there have been no packet dropped during the sampling time interval $\Delta T$, and a current queue size is below $Q_v$ minus the decrement.

2. The method as set forth in claim 1, wherein adaptively managing further comprises determining by the queue manager, after incrementing $Q_v$ by the increment, whether $Q_v$ is greater than Q.

3. The method as set forth in claim 2, wherein adaptively managing further comprises setting $Q_v$ to Q, by the queue manager, in response to determining $Q_v$ is greater than Q.

4. The method as set forth in claim 1, wherein adaptively managing further comprises determining by the queue manager, after decrementing $Q_v$ by the decrement, whether $Q_v$ is less than $Q_{min}$.

5. The method as set forth in claim 4, wherein adaptively managing further comprises setting $Q_v$ to $Q_{min}$, by the queue manager, in response to determining $Q_v$ is less than $Q_{min}$.

6. An apparatus comprising:
  an input port;
  an output port;
  a switch matrix configured to couple the input port with the output port;
  a queue with a real capacity Q, and associated with a selected one of the input port or the output port; and
  a queue manager configured to adaptively manage the queue, including configured to
    set a virtual queue capacity $Q_v$ for the queue to a capacity value $Q_{min}$, where $Q_{min}$ is smaller than Q,
    determine an amount of packet dropped within a sampling time interval $\Delta T$, and
    adjust $Q_v$ based on the result of said determination;
    wherein the queue manager is configured to increment $Q_v$ by an increment, in response to a result of the determination indicating there have been packets dropped during the sampling time interval $\Delta T$, and decrement $Q_v$ by a decrement, in response to a result of the determination indicating there have been no packet dropped during the sampling time interval $\Delta T$, and a current queue size is below $Q_v$ minus the decrement.

7. The apparatus as set forth in claim 6, wherein the queue manager is further configured to determine, after $Q_v$ has been incremented by the increment, whether $Q_v$ is greater than Q, and set $Q_v$ to Q, in response to $Q_v$ having been determined to be greater than Q.

8. The apparatus as set forth in claim 6, wherein the queue manager is further configured to determine, after $Q_v$ has been decremented by the decrement, whether $Q_v$ is less than $Q_{min}$, and set $Q_v$ to $Q_{min}$, in response to $Q_v$ having been determined to be less than $Q_{min}$.

9. The apparatus of claim 6, wherein the switch matrix is configured to route a packet from the input port to the output port in accordance with Transmission Control Protocol (TCP).

10. The apparatus of claim 6, wherein the apparatus is a selected one of a networking router or a networking switch.

11. An article of manufacture, comprising:
  non-transitory machine readable storage medium; and
  instructions stored in the storage medium, and configured to enable an apparatus, in response to execution of the instructions by the apparatus, to perform operations including
    setting a virtual queue capacity $Q_v$ of a queue associated with a port of the apparatus to a capacity value $Q_{min}$, wherein the queue has a real capacity of Q, where $Q_{min}$ is smaller than Q;
    determining an amount of packet dropped within a sampling time interval $\Delta T$; and
    adaptively managing the queue by adjusting $Q_v$ based on the result of said determining;
    wherein adaptively managing comprises
      incrementing $Q_v$ by an increment, in response to a result of the
      determining indicating there have been packets dropped during the sampling time interval $\Delta T$, and
      decrementing $Q_v$ by a decrement, in response to a result of the determining indicating there have been no packet dropped during the sampling time interval $\Delta T$, and a current queue size is below $Q_v$ minus the decrement.

12. The article as set forth in claim 11, wherein adaptively managing further comprises determining after incrementing $Q_v$ by the increment, whether $Q_v$ is greater than Q, and set $Q_v$ to Q, by the queue manager, in response to determining $Q_v$ is greater than Q.

13. The article as set forth in claim 11, wherein adaptively managing further comprises determining, after decrementing $Q_v$ by the decrement, whether $Q_v$ is less than $Q_{min}$, and setting $Q_v$ to $Q_{min}$, in response to determining $Q_v$ is less than $Q_{min}$.

14. An apparatus comprising:
  means for routing packets from an input port to an output port; and
  means for adaptively managing a queue with a real capacity of Q and associated with a selected one of the input port or the output port, including
    means for setting a virtual queue capacity $Q_v$ for the queue to a capacity value $Q_{min}$, where $Q_{min}$ is smaller than Q,
    means for determining an amount of packet dropped within a sampling time interval $\Delta T$, and
    means for adjusting $Q_v$ based on the result of said determination;
  wherein adjusting $Q_v$ comprises
    incrementing $Q_v$ by an increment, in response to a result of the determining indicating there have been packets dropped during the sampling time interval $\Delta T$, and
    decrementing $Q_v$ by a decrement, in response to a result of the determining indicating there have been no packet dropped during the sampling time interval $\Delta T$, and a current queue size is below $Q_v$ minus the decrement.

* * * * *